(12) United States Patent
Tsay et al.

(10) Patent No.: US 6,363,777 B1
(45) Date of Patent: Apr. 2, 2002

(54) GLIDE TEST HEAD ASSEMBLY WITH ENHANCED SIGNAL OUTPUT

(75) Inventors: Alex Yu-Chih Tsay; Chiao-Ping Ku, both of Fremont, CA (US); Thomas R. Prentice, Luther, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/497,371

(22) Filed: Feb. 3, 2000

(Under 37 CFR 1.47)

Related U.S. Application Data

(60) Provisional application No. 60/074,216, filed on Feb. 10, 1998.

(51) Int. Cl.[7] .............................. G01B 5/28; G01B 7/34
(52) U.S. Cl. ....................................................... 73/105
(58) Field of Search ........................................... 73/105

(56) References Cited

U.S. PATENT DOCUMENTS

| | | | |
|---|---|---|---|
| 5,689,064 A | * 11/1997 | Kennedy et al. | 73/105 |
| 5,963,396 A | * 10/1999 | Burga et al. | 73/105 |
| 6,000,282 A | * 12/1999 | Ku et al. | 73/105 |
| 6,016,692 A | * 1/2000 | Schaenzer et al. | 73/105 |
| 6,105,421 A | * 8/2000 | Yao et al. | 73/105 |
| 6,138,502 A | * 10/2000 | Burga et al. | 73/105 |

OTHER PUBLICATIONS

Briggs, J. et al., "High Frequency Slider Vibrations During Asperity Impacts in Rigid Magnetic Disk Systems", Adv. Info. Storage Syst., vol. 4, 1992, pp. 181–194.*
Wallash, A., "Reproduction of Slider Vibrations During Head/Disk Interactions Using PZT Sensors", IEEE Transactions on Magnetics, vol. 24, No. 6, 1988, pp. 2763–2765.*
Yeack-Scranton, C., "Novel Piezoelectric Transducers to Monitor Head/Disk Interactions", IEEE Transactions on Magnetics, vol. MAG–22, No. 5, Sep. 1986, pp. 1011–1016.*

* cited by examiner

Primary Examiner—Daniel S. Larkin
(74) Attorney, Agent, or Firm—Edward P. Heller, III; Raghunath S. Minisandram

(57) ABSTRACT

A glide test head assembly glide test head assembly in which the mounting orientation of the piezo element has been modified. The glide test head assembly mounts the piezo element with one of its major surfaces coincident with the surface of the laterally-extending wing on which it is mounted. The mounting orientation of the piezo element allows the piezo element to be mounted fully on the laterally-extending wing of the glide test head assembly, raising the resonant frequency of the piezo element, decreasing the glide test head assembly's sensitivity to excitation caused by air flow disturbances, and increasing the reliability of glide test results.

2 Claims, 4 Drawing Sheets

GLIDE TEST HEAD ASSEMBLY WITH ENHANCED SIGNAL OUTPUT

CROSS-REFERENCE TO RELATED APPLICATION

The following patent application is based on U.S. Provisional Patent Application Ser. No. 60/074,216 filed Feb. 10, 1998.

BACKGROUND OF THE INVENTION

This invention relates generally to the field of rigid disc drives, and more particularly, but not by way of limitation, to a glide test head assembly for use in testing magnetic disc recording media surface characteristics.

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

As the physical size of disc drives has decreased historically, the physical size of many of the disc drive components has also decreased to accommodate this size reduction. Similarly, the density of the data recorded on the magnetic media has been greatly increased. In order to accomplish this increase in data density, significant improvements in both the recording heads and recording media have been made.

For instance, the first rigid disc drives used in personal computers had a data capacity of only 10 megabytes, and were in the format commonly referred to in the industry as the "full height, 5¼" format. Disc drives of the current generation typically have a data capacity of over a gigabyte (and frequently several gigabytes) in a 3½" package which is only one fourth the size of the full height, 5¼" format or less. Even smaller standard physical disc drive package formats, such as 2½" and 1.8", have been established. In order for these smaller envelope standards to gain market acceptance, even greater recording densities must be achieved.

The recording heads used in disc drives have evolved from monolithic inductive heads to composite inductive heads (without and with metal-in-gap technology) to thin-film heads fabricated using semi-conductor deposition techniques to the current generation of thin-film heads incorporating inductive write and magneto-resistive (MR) read elements. This technology path was necessitated by the need to continuously reduce he size of the gap in the head used to record and recover data, since such a gap size reduction was needed to reduce the size of the individual bit domain and allow greater recording density.

Since the reduction in gap size also meant that the head had to be closer to the recording medium, the quest for increased data density also lead to a parallel evolution in the technology of the recording medium. The earliest Winchester disc drives included discs coated with "particulate" recording layers. That is, small particles of ferrous oxide were suspended in a non-magnetic adhesive and applied to the disc substrate. With such discs, the size of the magnetic domain required to record a flux transition was clearly limited by the average size of the oxide particles and how closely these oxide particles were spaced within the adhesive matrix. The smoothness and flatness of the disc surface was also similarly limited. However, since the size of contemporary head gaps allowed data recording and retrieval with a head flying height of twelve microinches (0.000012 inches, $12\mu$") or greater, the surface characteristics of the discs were adequate for the times.

Disc drives of the current generation incorporate heads that fly at nominal heights of only about $2.0\mu$", and products currently under development will reduce this flying height to $1.5\mu$" or less. Obviously, with nominal flying heights in this range, the surface characteristics of the disc medium must be much more closely controlled than was the case only a short time ago.

In current disc drive manufacturing environments, it is common to subject each disc to component level testing before it is assembled into a disc drive. One type of disc test is referred to as a "glide" test, which is used as a go/no-go test for surface defects or asperities, or excessive surface roughness. A glide test typically employs precision spin stand and a p2t-glide test head. The glide test is performed with the test head flown at approximately half the flying height at which the operational read/write head will fly in the finished disc drive product. For instance, if the disc being glide tested is intended for inclusion in a disc drive in which the operational heads will fly at $2.0\mu$", the glide test will typically be performed with the glide test head flying at $1.0\mu$". During the glide test, any contact between the glide test head assembly and an irregularity on the surface of the disc being glide tested causes mechanical excitation of the slider body of the glide test head assembly, which in turn excites the piezo element carried on the glide test head assembly, causing it to output an electrical signal whose amplitude is reflective of the severity of the impact. The test system in which the glide test head assembly is used typically monitors this electrical signal, and compares its amplitude with a preset threshold level. If the output of the glide test head assembly exceeds the preset threshold level, the disc is considered unusable, and scrapped. If the glide test is completed without contact between the glide test head assembly and any surface defects, then the disc is passed for incorporation in a disc drive assembly on the assumption that there will be no contact between the operational heads and the discs during normal operation with an operational read/write head flying height twice that of the glide test head flying height.

Typical glide test head assemblies of the prior art mount the piezo element on a wing which extends laterally from the main slider body which includes the air bearing surfaces used to fly the glide test head assembly above the disc being tested. It is common to mount the piezo element at the extreme outer lateral edge of the laterally-extending wing, and to position the piezo element in a manner which causes it to overhang the trailing edge of the laterally-extending wing.

The piezo element is typically in the form of a rectilinear solid, and is mounted with its major axis extending in the direction of disc motion beneath the glide test head assembly, and its minor axis parallel with the plane of the disc surface.

The lead connections that carry the output signal from the piezo element are typically attached to the top and bottom surfaces of the piezo element in that portion of the piezo element which overhangs the trailing edge of the laterally-extending wing.

A consequence of this mounting location and orientation of the piezo element is that the natural resonant frequency of the piezo element is lowered. With the resonant frequency of the piezo element thus lowered, it has been found that the piezo element can be excited by air flow disturbances around the glide test head assembly, resulting in excitation of the piezo element—and electrical signal output from the piezo element—that is not caused by actual contact between the glide test head assembly and the disc under test.

Since typical test systems for glide testing cannot readily distinguish between piezo element outputs that are the result of true head/disc contact and those piezo element outputs that are merely the result of excitation of the piezo element by air flow disturbances, any detected excitation of the piezo element must be considered to be the result of contact between the glide test head assembly and the disc, and, in consequence, the disc may be found defective and scrapped, even though it has no actual surface defects that would cause operational problems in a disc drive. Such unnecessary scrapping of usable discs drives up the unit cost of disc drive products.

A need exists, therefore, for a glide test head assembly which includes a piezo element that has a high enough resonant frequency to be capable of distinguishing between spurious excitation caused by air flow disturbances and true head/disc contacts.

SUMMARY OF THE INVENTION

The present invention is a glide test head assembly in which the mounting orientation of the piezo element has been modified. The glide test head assembly mounts the piezo element with one of its major surfaces coincident with the surface of the laterally-extending wing on which it is mounted. The mounting orientation of the piezo element allows the piezo element to be mounted fully on the laterally-extending wing of the glide test head assembly, raising the resonant frequency of the piezo element, decreasing the glide test head assembly's sensitivity to excitation caused by air flow disturbances and increasing the reliability of glide test results.

The manner in which the present invention is implemented, as well as other features, benefits and advantages of the invention, can best be understood by a review of the following Detailed Description of the Invention, when read in conjunction with an examination of the accompanying drawings.

DETAILED DESCRIPTION OF THE INVENTION

Figure 1:
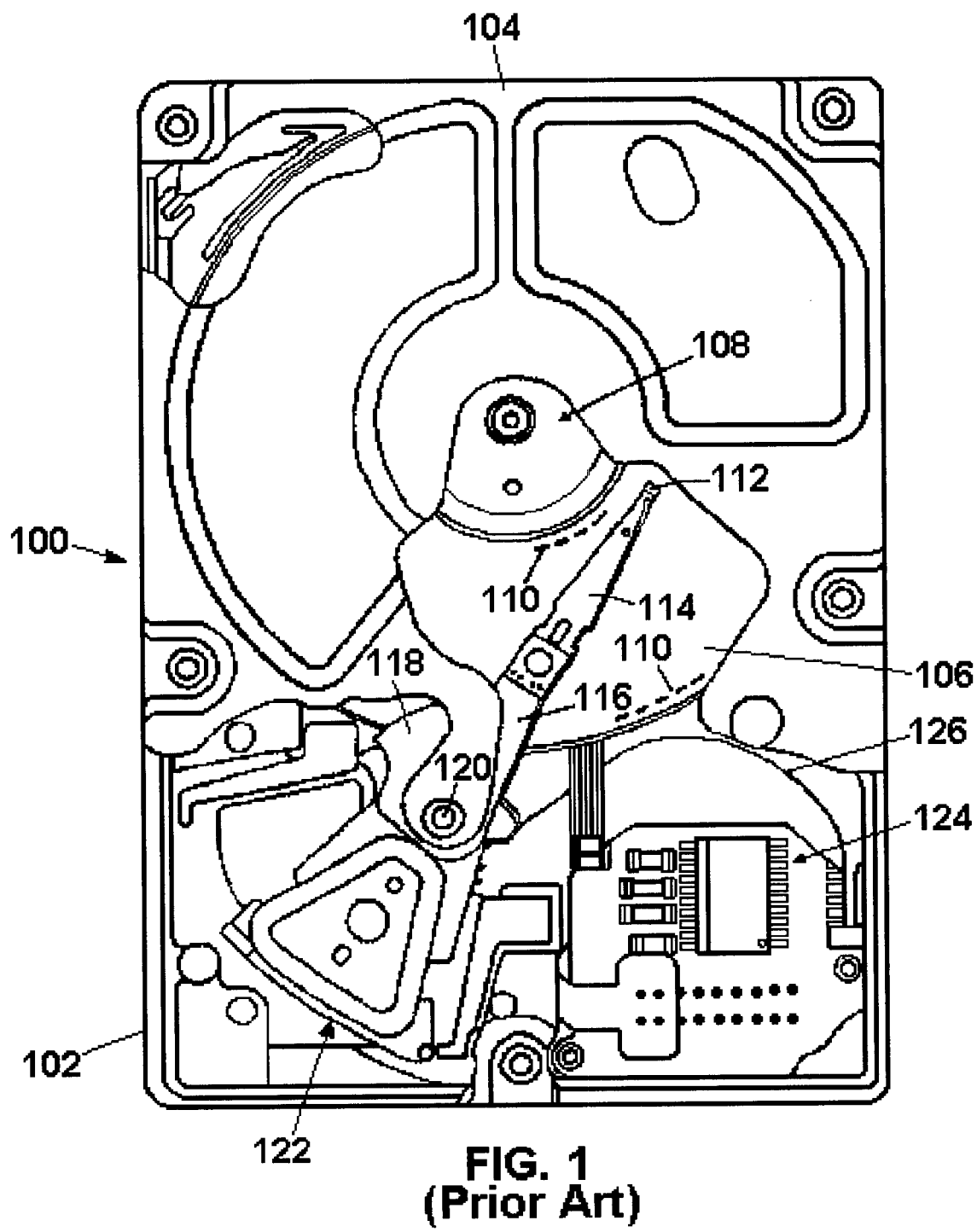
FIG. 1 is a plan view of a disc drive in which discs, which can be tested using the glide test head of the present invention, are utilized.

Turning now to the drawings and specifically to FIG. 1, shown is a plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of precision ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

It will be apparent to one of skill in the art that the proper operation of the disc drive 100 will depend in large part to the existence of a controlled, precise relationship between the head assemblies 112 and the discs 106. Therefore, it is common in the industry to test each of the discs 106 included in the disc drive 100 before the discs 106 are assembled into a disc drive 100.

Figure 2:
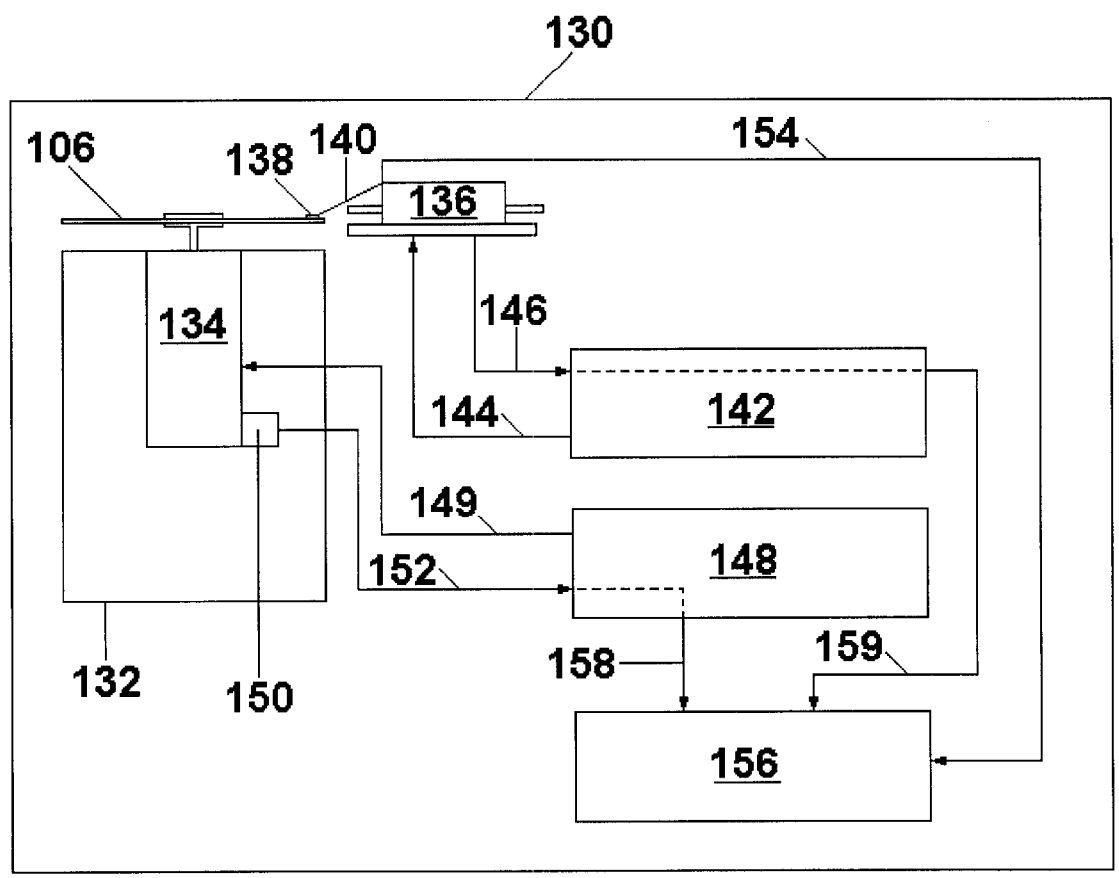
FIG. 2 is a simplified functional block diagram of a prior art test system in which the glide test head of the present invention can be integrated.

FIG. 2 is a simplified functional block diagram of a typical prior art test unit 130 used to test and map the surface of recording discs as components before the discs are assembled into disc drive units. The test unit 130 includes a precision spin stand 132 which further includes a spin motor 134 on which the disc 106 is mounted for rotation and testing.

The test unit 130 also typically includes a linear actuator 136 which is used to controllably move a glide test head 138, mounted on a head suspension 140, on a linear path across a radius of the disc 106. Actuator control logic 142 is also included in the test unit 130 and provides the control signals on signal path 144 needed to move the glide test head 138 and monitors, via signal path 146, the position of the glide test head 138 during testing of the disc 106. In a typical test unit of the current art, the actuator supports and controls a second glide test head for simultaneous testing of the second disc surface. For purposes of clarity, the figure shows only a single glide test head 138.

The test unit 130 also includes spin motor control logic 148 which is used to accelerate the spin motor 134 to its intended testing speed by passing motor drive signals on path 149. It is common practice in the industry to vary the speed of the spin motor 134 as the glide test head 138 is moved across the disc radius to provide a constant linear velocity between the glide test head 138 and the area of the disc being tested. That is, as the glide test head 138 is moved inward, the speed of the spin motor is increased proportionally to maintain a constant linear velocity, and thus maintain a constant flying height for the glide test head 138.

The spin stand 132 also includes a spin motor position detection element 150 which provides a disc rotational position reference signal. This reference signal is carried over signal path 152 to the spin motor control logic 148 where it is used to assist in the control of the speed of the spin motor 134.

During the testing operation, a disc 106 is mounted on the spin motor 134 and the spin motor 134 is brought up to operational speed by the spin motor control logic 148. Once the spin motor 134 is at the proper speed, the actuator control logic 142 causes the actuator 136 to move the glide test head 138 into cooperative arrangement with the surface of the disc 106. The glide test head 138 is then stepped across the spinning disc 106 at a rate selected to cause the glide test head 138 to pass over every portion of the disc surface. As the glide test head 138 is stepped across the disc surface, the spin motor control logic 148 varies the spin motor speed to maintain a constant relative linear velocity between the glide test head 138 and the disc area being tested as noted above.

A defect on the disc surface will cause the glide test head 138 to generate a defect detection signal which is passed via signal path 154 to threshold comparison logic 156, where the amplitude of the defect detection signal is compared to a preselected threshold level. If the amplitude of the defect detection signal on signal path 154 exceeds the threshold level established for the glide test being performed, the disc 106 being tested is scrapped on the assumption that its surface includes a defect of sufficient size to negatively affect the operation of a disc drive in which it is intended for use.

It is also known in the industry to constantly monitor the rotational position of the disc 106 under test via the signal on signal path 158 and the position of the glide test head 138 relative to the disc 106 on signal path 159 to enable mapping of the location of detected disc surface defects.

Test units of the type described above and which can be modified to include and implement the present invention are available from several sources. A typical test unit of this type is the model number MSA 450, manufactured by Cambrian Systems, Inc., a subsidiary of Phase Metrics Corporation, located in Westlake Village, Calif.

Figure 3:
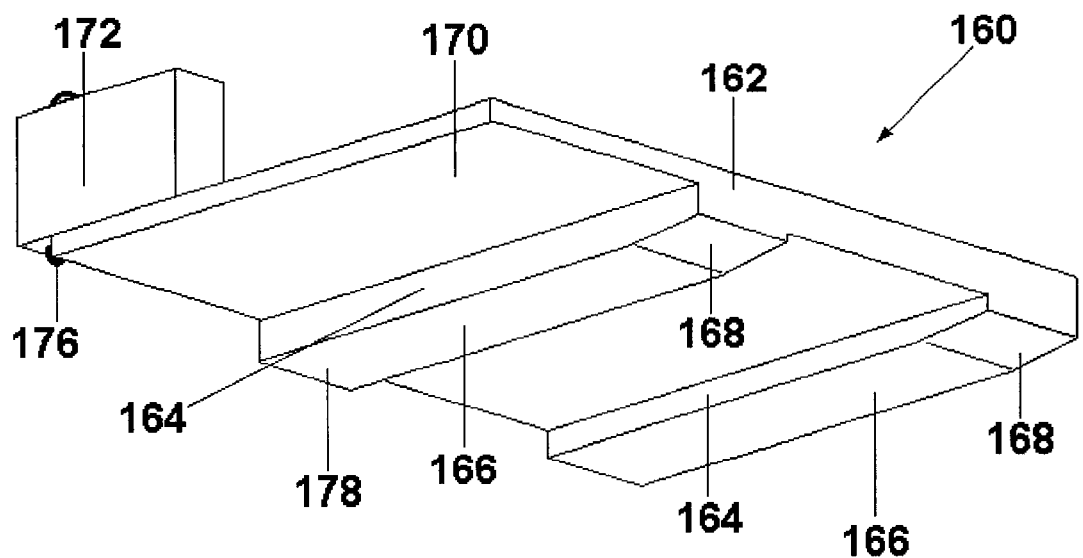
FIG. 3 is a simplified bottom perspective view of a typical prior art glide test head.
Figure 4:
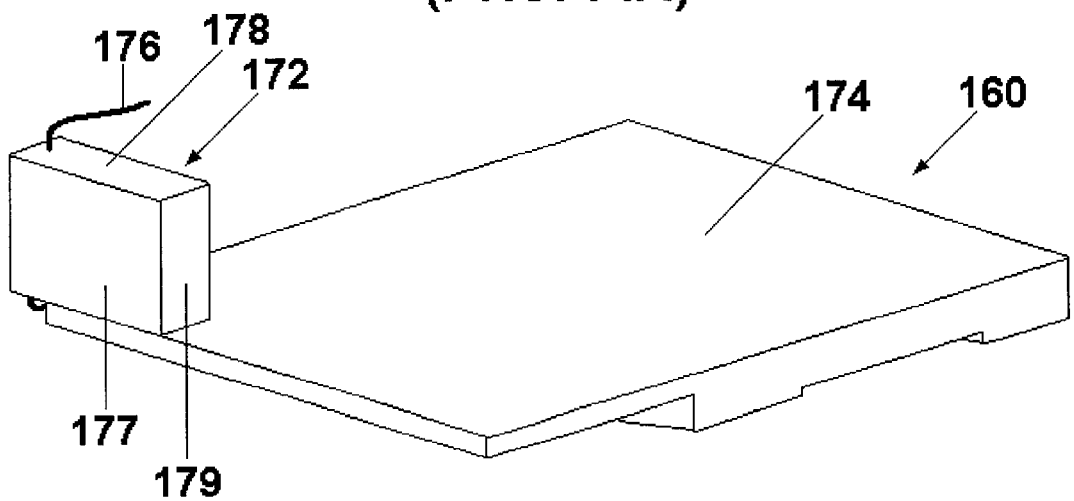
FIG. 4 is a simplified top perspective view of a typical prior art glide test head.

FIGS. 3 and 4 are, respectively, simplified bottom and top perspective views of a typical prior art glide test head 160. The glide test head consists of a slider body 162 which is typically formed from a stable ceramic material, such as aluminum oxide/titantium carbide. Features of the slider body 162 are commonly formed using the processes of machining, ion etching and precision lapping.

The glide test head 160 is of the type sometimes referred to as a "catamaran" slider configuration, since it includes a pair of laterally displaced rails 164. The rails 164 include air bearing surfaces 166, which interact with a thin layer of air dragged along by the spinning disc to fly the glide test head 160 at a desired fly height above the surface of the disc being tested. As is known to those of skill in the art, the flying height is determined, in part, by the geometry of the air bearing surfaces, and the flying attitude of the slider body is a function of the geometry of the air bearing surface, as well as the head suspension (140 in FIG. 2) used to support the glide test head 160.

At the leading edge of the air bearing surfaces 166 the rails 164 also typically include beveled regions 168 which are included to aid in the rapid establishment of the air bearing between the slider body 162 and the spinning disc.

While other forms of slider bodies are known in the art, such as tri-pad sliders and negative pressure air bearing sliders, the scope of the present invention is not envisioned as being limited by the specific form of air bearing elements included in the slider body 162. The catamaran form of FIGS. 3 and 4 has been chosen for illustrative purposes only, due to its familiarity and simplicity.

FIGS. 3 and 4 show that the slider body 162 also includes a laterally extending wing 170 which is used to mount a piezoelectric crystal, or piezo element 172. The reason that the slider body 162 must include the wing 170 for mounting the piezo element 172 is that that portion (shown at 174, generally, in FIG. 4) of the slider body 162 above the rails 164 is used to attach the head suspension (140 in FIG. 2) used to support the glide test head 160.

The piezo element 172 can be seen in the figures to include attached signal wires 176. During operation, such as in a test system similar to that of FIG. 2, any contact between the air bearing surfaces 166 and a surface asperity on the disc under test will result in oscillation or ringing of the entire slider body 162. This excitation of the slider body 162 is conveyed to the piezo element 172 which responds to this excitation by outputting defect detection signals on the signal wires 176. These defect detection signals are passed to appropriate detection logic (such as the threshold comparison logic 156 of FIG. 2). If, as noted in the discussion of FIG. 2 above, the amplitude of the defect detection signals exceeds a preselected threshold level, the disc under test is considered to have failed the glide test and is scrapped.

The principal limitation of the prior art glide test head 160 of FIGS. 3 and 4 is brought about by the orientation with which the piezo element 172 is mounted on the laterally-extending wing 170. As can be seen in the figure, the piezo element 172 is mounted with its major surfaces 177 perpendicular to the laterally-extending wing 170, and can be seen to also extend beyond the trailing edge of the laterally-extending wing 170. The prior art glide test head 160 also includes semi-major surfaces 178 and minor surfaces 179.

The signal wires 176 are mounted on the top and bottom semi-major surfaces 178 of the piezo element 172 in that portion of the piezo element 172 which overhangs the rearmost extent of the glide test head. The crystalline structure of the piezo element 172 is anisotropic, and has an axis of maximum sensitivity which is typically normal to the semi-major surfaces 178, and the signal wires 176 are typically located on these surfaces for this reason. The direction of maximum sensitivity will also be referred to hereinafter as the "polarization direction".

With this orientation and mounting position of the piezo element 172 relative to the slider body 162, the natural resonant frequency of the piezo element 172 is low enough to cause excitation of the piezo element 172 by air flow disturbances between the glide test head assembly 160 and the disc being tested. This, in turn, can result in the generation of spurious defect detection signals, and the unnecessary scrapping of discs that are actually capable of use in a disc drive.

Figure 5:
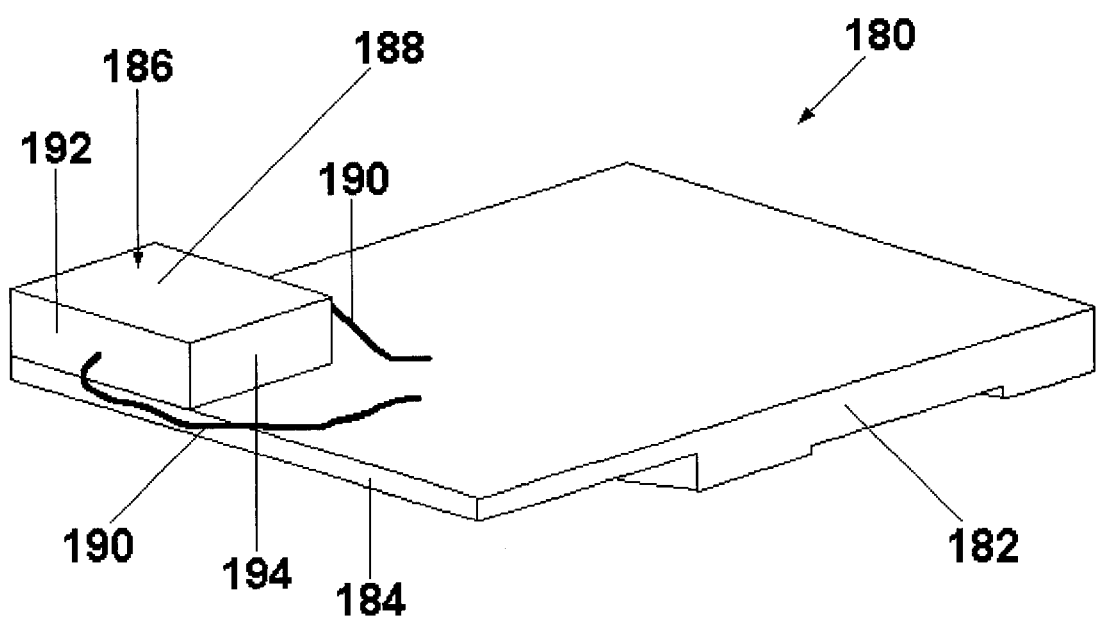
FIG. 5 is a simplified top perspective view of the glide test head assembly of the present invention.

FIG. 5 is a simplified top perspective view, similar to that of FIG. 3, showing the glide test head assembly 180 of the present invention. The glide test head 180 is comprised of a slider body 182 having air bearing surfaces (not designated) and a laterally-extending wing 184 all similar to those of the prior art glide test head assembly 160 of FIGS. 3 and 4. Once again, it should be noted that the specific structure of the air bearing surfaces is not considered as limiting to the scope of the present invention.

In the figure, it can be seen that the piezo element 186 has been differently oriented and positioned relative to the laterally-extending wing 184 from the orientation and position of the piezo element 172 in FIGS. 3 and 4. Specifically, the piezo element 186 is now mounted with one of its major surfaces, the opposite of which is designated 188, in contact with the surface of the laterally-extending wing 184. The signal wires 190 are still connected to the same semi-major surfaces 192 of the piezo element 186, but with the present orientation of the piezo element 186, the signal wires are now connected in a laterally opposed manner. FIG. 5 also shows the minor surface 194 of the piezo element 186. Since both signal wire termination locations are now above the top surface of the laterally extending wing 184, there is also no need for the piezo element 186 to extend beyond the trailing edge of the slider body 182, and the laterally outermost and trailing edges of the piezo element 186 can be seen to be aligned with the laterally outermost and trailing edges of the laterally-extending wing 184. Several benefits are derived from this reorientation and repositioning of the piezo element 186.

Firstly, since the entire piezo element 186 is mounted over the laterally-extending wing 184, i.e., no portion of the piezo element 186 overhangs the laterally-extending wing 184, the sensitivity of the piezo element 186 to excitation by air flow disturbances is reduced, and the confidence level of glide testing is increased, since a detected output from the piezo element 186 is more likely to truly reflect actual head/disc contact than was possible with the prior art glide test head assembly 160 of FIGS. 3 and 4.

Secondly, since the polarization direction of the piezo element 186, i.e., the axis perpendicular to the surfaces on which the output lead connections 190 are attached, is in parallel with the axis of maximum excitation of the slider body 182 due to head/disc contact, any excitation of the slider body 182 as a result of head/disc contact will result in a greater amplitude in the output signal of the piezo element 186, further enhancing the validity and sensitivity of the glide test.

Testing of prototypes of the glide test head assembly of the present invention has shown that the glide test head assembly of the present invention is significantly effective in lack of response to low frequency (i.e., below 300 kHz) excitation of the glide test head slider body, while having increased sensitivity to higher frequency (i.e., above 300 kHz) excitation of the glide test head slider body, and is thus particularly effective in distinguishing between low frequency excitation of the glide test head slider body due to air flow turbulence and high frequency excitation of the glide test head slider body caused by actual contacts between the glide test head assembly and a disc under test. The inclusion of the glide test head of the present invention in a test system, such as that of FIG. 2 can, therefore, be expected to provide a higher reliability in glide test results, and the reduction of scrapped discs due to false defect detection.

From the foregoing, it is apparent that the present invention is particularly well suited and well adapted to achieve the functionality set forth hereinabove, as well as possessing other advantages inherent therein. While a particular configuration of the present invention has been disclosed as an example embodiment, certain variations and modifications which fall within the envisioned scope of the invention may be suggested to one of skill in the art upon reading this disclosure. Therefore, the scope of the present invention should be considered to be limited only by the following claims.

What is claimed is:

1. A glide test head assembly for detecting surface defects on a magnetic recording disc comprising:

a slider body further including a laterally-extending wing having laterally outermost and trailing edges; and a piezo element, in the form of a rectilinear solid having major, semi-major, and minor surfaces, mounted on the laterally-extending wing with one of the major surfaces contacting the laterally-extending wing and aligned with the laterally outermost and trailing edges of the laterally-extending wing, for outputting a defect detection signal reflective of contact between the glide test head assembly and the disc, the piezo element further comprising output lead connections on the minor surfaces for carrying the defect detection signal.

2. A glide test head assembly for detecting surface defects on a magnetic recording disc comprising:

a slider body further including a laterally-extending wing; and means mounted on said laterally-extending wing for outputting a defect detection signal reflective of contact between the glide test head assembly and the disc.

* * * * *